(12) United States Patent
Wu

(10) Patent No.: US 11,146,334 B2
(45) Date of Patent: Oct. 12, 2021

(54) SYSTEM AND METHOD FOR FIBER-OPTIC TIME, FREQUENCY AND DATA JOINT TRANSMISSION

(71) Applicant: Shanghai Jiao Tong University, Shanghai (CN)

(72) Inventor: Guiling Wu, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 0 days.

(21) Appl. No.: 17/039,823

(22) Filed: Sep. 30, 2020

(65) Prior Publication Data

US 2021/0021345 A1     Jan. 21, 2021

Related U.S. Application Data

(63) Continuation of application No. PCT/CN2020/086263, filed on Apr. 23, 2020.

(30) Foreign Application Priority Data

May 28, 2019   (CN) .......................... 201910449025.2

(51) Int. Cl.
*H04B 10/25*     (2013.01)
*H04B 10/11*     (2013.01)
*H04J 14/08*     (2006.01)

(52) U.S. Cl.
CPC ......... *H04B 10/2589* (2020.05); *H04B 10/11* (2013.01); *H04J 14/08* (2013.01)

(58) Field of Classification Search
CPC .... H04B 10/2589; H04B 10/11; H04B 10/25; H04B 10/29; H04B 10/297; H04J 14/08
(Continued)

(56) References Cited

U.S. PATENT DOCUMENTS 5,673,133 A * 9/1997 Imaoka ................. H04L 7/0075
                                                                                                       398/202
9,331,844 B2   5/2016   Nuijts et al.
(Continued)

FOREIGN PATENT DOCUMENTS

| CN | 105739215 A | 7/2016 |
| CN | 109428665 A | 3/2019 |
| CN | 109921872 A | 6/2019 |

OTHER PUBLICATIONS

Eidson, John, et al., "IEEE 1588 standard for a precision clock synchronization protocol for networked measurement and control systems," 34th Annual Precise Time and Time Interval (PTTI) Meeting, IEEE, pp. 243-254 (2002).

*Primary Examiner* — Abbas H Alagheband
(74) *Attorney, Agent, or Firm* — Mei & Mark LLP; Manni Li

(57) ABSTRACT

System and method for fiber-optic time frequency and data joint transmission, comprising local end, relay nodes, and remote end. In each local end, relay node, and remote end, multiplexing and demultiplexing of time frequency signals, optical supervisory signals, and optical communication data services are performed by CWDM modules and OSC-band wavelength multiplexer/demultiplexers, and processing (transmitting, relaying, receiving) is performed by corresponding processing modules for joint transmission. A sub-band of standard OSC band is used for transmitting time frequency signal so that transmission of optical supervisory signal is not influenced while no extra band resource is occupied with improved utilization of wavelength resources and reduced costs. Wavelengths of time and frequency transfer in both directions in sub-band of OSC band are flexibly selected and combined to meet different requirements; wavelengths are close or same so that bidirectional
(Continued)

n relay amplification nodes in total symmetry of the link is guaranteed to the maximum with improved precision.

6 Claims, 6 Drawing Sheets

(58) Field of Classification Search
USPC .......................................................... 398/98
See application file for complete search history.

(56) References Cited

U.S. PATENT DOCUMENTS

| | | | |
|---|---|---|---|
| 10,003,426 B2* | 6/2018 | Jiang | H04J 14/0213 |
| 2005/0180575 A1* | 8/2005 | Maeda | H04L 7/0075 |
| | | | 380/278 |
| 2006/0285846 A1* | 12/2006 | Uekama | H04B 10/0775 |
| | | | 398/30 |
| 2007/0258721 A1* | 11/2007 | Boduch | H04B 10/07951 |
| | | | 398/147 |
| 2011/0141552 A1* | 6/2011 | Ghera | H04B 10/2916 |
| | | | 359/334 |
| 2012/0051739 A1* | 3/2012 | Stephens | H04B 10/0773 |
| | | | 398/25 |
| 2012/0183294 A1* | 7/2012 | Boertjes | H04J 14/0268 |
| | | | 398/49 |
| 2014/0199072 A1* | 7/2014 | Nuijts | H04J 3/0682 |
| | | | 398/75 |

* cited by examiner

SYSTEM AND METHOD FOR FIBER-OPTIC TIME, FREQUENCY AND DATA JOINT TRANSMISSION

CROSS-REFERENCE TO RELATED APPLICATIONS

The subject application is a continuation of PCT/CN2020/086263 filed on Apr. 23, 2020, which claims priority on Chinese Application No. CN201910449025.2 filed on May 28, 2019 in China. The contents and subject matter of the PCT international application and the Chinese priority application are incorporated herein by reference.

TECHNICAL FIELD

The present invention relates to fiber-optic time, frequency and communication data joint transmission, in particular, to a system and method for optical fiber time, frequency and communication data joint transmission for a wavelength division multiplexing (WDM) system.

BACKGROUND ART

A high-precision time and frequency primary standard is an important support in the fields such as satellite navigation, precision measurement, geological mapping, time frequency systems and deep space exploration. In the present, time and frequency transfer techniques based on free space channels, such as GPS common-view and two-way satellite time and frequency transfer, can only be nano second precision in time transfer and a stability of $10^{-15}$/day in frequency transfer due to the interference of environmental factors on free space transmission links, thereby not meeting the requirements of high-precision time and frequency transfer and synchronization.

Optical fiber transmission has been widely used in the field of communication because of its advantages of low loss, high capacity, and high reliability. High-precision time and frequency transfer and synchronization can be implemented with dedicated optical fiber links, however, the costs for laying or leasing dedicated optical fiber links are high, which greatly limits the application of the large-scale and large-coverage high-precision time and frequency transfer.

Existing optical fiber communication networks, which are widely distributed, can be utilized for fiber-optic time and frequency transfer with greatly reduced costs, providing an ideal choice for implementing high-precision large-coverage fiber-optic time and frequency transfer. Network time protocol (NTP) and precision time protocol (PTP) are widely used time synchronization techniques in existing networks. However, time synchronization based on NTP and PTP can only be ms/μs-accurate, which does not meet the requirements of high-precision time and frequency transfer.

In 2016, a system and method for network synchronization and frequency dissemination is disclosed, in which time and frequency signals in two opposite directions are carried in a 1470 nm band (1460 nm to 1480 nm) and a 1490 nm band (1480 nm to 1500 nm), respectively, and are transmitted over the same optical fiber with an optical supervisory channel (OSC) and communication wavelengths through coarse wavelength division multiplexing (CWDM). However, according to the method, forward and backward time frequency optical signals are carried at wavelengths in different coarse wavelength division bands, and the difference between the wavelengths for forward and backward optical transmission is very large, which causes serious asymmetry of delays in the forward and backward transmission, so that the precision of time and frequency transfer is limited, and complicated link calibration is also required, especially for long-distance transmission. In addition, the method provides a dedicated coarse wavelength division multiplexer for each node to carry out demultiplexing to obtain an OSC band (1500 nm to 1520 nm), an optical communication band, a 1470 nm band (1460 nm to 1480 nm) and a 1490 nm band (1480 nm to 1500 nm) from a single optical fiber. The coarse wavelength division multiplexers (CWDM) are not compatible with CWDMs in existing commercial WDM optical networks, which can only carry out demultiplexing to obtain an OSC band (1500 nm to 1520 nm) and an optical communication band, and therefore, the CWDMs in existing commercial WDM optical networks need to be replaced for implementation. It not only increases the costs for implementation, but also causes the interruption of the original communication services, which causes a greatly impact on communication operators sand user services. Further, the method occupies coarse wavelength division bands available for communication services, and with rapid growth of communication services, the method will be increasingly limited as being constrained by wavelength resources.

SUMMARY OF THE INVENTION

The present invention overcomes the defects and provides a system and method for fiber-optic time frequency and data joint transmission. The system and method of the present invention transmit a time frequency signal and an optical supervisory signal individually using different sub-bands within a standard OSC band in an optical communication network, and achieves joint transmission of the time frequency signal and the optical supervisory signal with optical communication data over the same optical fiber through CWDM modules in a commercial WDM optical communication system.

The present invention provides a system for fiber-optic time frequency and data joint transmission, comprising a local end (101), the local end (101) comprising a local time frequency signal unit (102), a local optical supervisory signal transmitting unit (103), a local optical communication data unit (104), a local OSC-band wavelength multiplexer/demultiplexer (105), and a local wavelength multiplexer/demultiplexer (106); a relay section formed by n number of relay nodes (401) that are connected in series through optical fibers, and a remote end (201), wherein n is an integer that equals to or is greater than 0; the local end (101) is connected to a first relay node (401) through a first optical fiber (301), and the n-th relay node (401) is connected to the remote end (201) through a second optical fiber (303); the local time frequency signal unit (102) is connected to a demultiplexing port (2) of the local OSC-band wavelength multiplexer/demultiplexer (105), the local optical supervisory signal transmitting unit (103) is connected to a demultiplexing port (1) of the local OSC-band wavelength multiplexer/demultiplexer (105), a multiplexing port (3) of the OSC-band wavelength multiplexer/demultiplexer (105) is connected to a demultiplexing port (1) of the local wavelength multiplexer/demultiplexer (106), the local optical communication data unit (104) is connected to a demultiplexing port (2) of the local wavelength multiplexer/demultiplexer (106), and the multiplexing port (3) of the local wavelength multiplexer/demultiplexer (106) is connected to one end of the first optical fiber (301); each relay node (401) comprises a first wavelength multiplexer/demultiplexer (410), a communication data relay amplification unit (411), a first OSC-band wavelength multiplexer/demultiplexer (407), a time frequency bidirectional relay amplification unit (402), an optical supervisory signal receiving unit (408), an optical supervisory signal transmitting unit (409), a second OSC-band wavelength multiplexer/demultiplexer (413), and a second wavelength multiplexer/demultiplexer (412);

a multiplexing port (3) of the first wavelength multiplexer/demultiplexer (410) is connected to other end of the first optical fiber (301), a demultiplexing port (2) of the first wavelength multiplexer/demultiplexer (410) is connected to a port (1) of the communication data relay amplification unit (411), a demultiplexing port (1) of the first wavelength multiplexer/demultiplexer (410) is connected to a multiplexing port (3) of the first OSC-band wavelength multiplexer/demultiplexer (407), a demultiplexing port (2) of the first OSC-band wavelength multiplexer/demultiplexer (407) is connected to the optical supervisory signal receiving unit (408), and a demultiplexing port (1) of the first OSC-band wavelength multiplexer/demultiplexer (407) is connected to a port 1 of the time frequency bidirectional relay amplification unit (402); a port (2) of the time frequency bidirectional relay amplification unit (402) is connected to a demultiplexing port (2) of the second OSC-band wavelength multiplexer/demultiplexer (413), the optical supervisory signal transmitting unit (409) is connected to a demultiplexing port (1) of the second OSC-band wavelength multiplexer/demultiplexer (413), a multiplexing port (3) of the second OSC-band wavelength multiplexer/demultiplexer (413) is connected to a demultiplexing port (1) of the second wavelength multiplexer/demultiplexer (412), a port (2) of the communication data relay amplification unit (411) is connected to a demultiplexing port (2) of the wavelength multiplexer/demultiplexer (412), and a multiplexing port (3) of the second wavelength multiplexer/demultiplexer (412) is connected to the multiplexing port (3) of the first wavelength multiplexer/demultiplexer (410) of a next relay node 401 through an optical fiber; then relay amplification nodes (401) of the relay section are sequentially connected through optical fibers; and the multiplexing port (3) of the second wavelength multiplexer/demultiplexer (412) of the n-th relay node is connected to the second optical fiber (303); and the remote end (201) comprises a remote time frequency signal unit (202), a remote optical supervisory signal receiving unit (203), a remote communication data unit (204), a remote OSC-band wavelength multiplexer/demultiplexer (205) and a remote wavelength multiplexer/demultiplexer (206), wherein the remote time frequency signal unit (202) is connected to a demultiplexing port (1) of the remote OSC-band wavelength multiplexer/demultiplexer (205), the remote optical supervisory signal receiving unit (203) is connected to a demultiplexing port (2) of the remote OSC-band wavelength multiplexer/demultiplexer (205), a multiplexing port (3) of the remote OSC-band wavelength multiplexer/demultiplexer (205) is connected to a demultiplexing port (1) of the remote wavelength multiplexer/demultiplexer (206), the remote communication data unit (204) is connected to a demultiplexing port (2) of the remote wavelength multiplexer/demultiplexer (206), and a multiplexing port (3) of the remote wavelength multiplexer/demultiplexer (206) is connected to the other end of the second optical fiber (303).

In the present invention, the OSC band adopted by the system is a selectable OSC band specified by current or future ITU-T Recommendations; and the local OSC-band wavelength multiplexer/demultiplexer (105), the first OSC-band wavelength multiplexer/demultiplexer (407), the second OSC-band wavelength multiplexer/demultiplexer (413), and the remote OSC-band wavelength multiplexer/demultiplexer (205) operate in the selected OSC band for multiplexing/demultiplexing of a wavelength of an optical supervisory signal and a wavelength of a time frequency transfer signal.

In the present invention, the OSC band is 1500 nm to 1520 nm, 1470 nm to 1490 nm, or a 1310 nm band.

In the present invention, the local wavelength multiplexer/demultiplexer (106), the first wavelength multiplexer/demultiplexer (410), the second wavelength multiplexer/demultiplexer (412), and the remote wavelength multiplexer/demultiplexer (206) are used for multiplexing/demultiplexing of the OSC band and operating optical bands of the local optical communication data unit (104) and the remote communication data unit (204).

In the present invention, the wavelength of the time frequency transfer signal and the wavelength of the optical supervisory signal adopted by the system are both in the OSC band and within non-overlapped wavelength ranges.

In the present invention, the time frequency signal and the optical supervisory signal are carried at different optical wavelengths in the OSC band, communication data is carried at an wavelength out of the OSC band, and the three signals are transmitted through one optical fiber by means of wavelength division multiplexing.

The present invention further provides a method for time frequency and data joint transmission using the system as described above, comprising: (1) transmitting a time frequency signal by forward and backward transmission, wherein the time frequency signal is transmitted in a direction from a local end to a remote end in the forward transmission, comprising generating a forward time frequency optical signal having a wavelength of $\lambda_2$, or $\lambda_2$, $\lambda_3$ when time transfer and frequency transfer are separated, by the local time frequency signal unit (102), and transmitting the forward time frequency optical signal to the first optical fiber (301) through the local OSC-band wavelength multiplexer/demultiplexer (105) and the local wavelength multiplexer/demultiplexer (106); carrying out an amplification process by a first relay node by inputting the optical signal from the first optical fiber (301) into the first OSC-band wavelength multiplexer/demultiplexer (407) by the first wavelength multiplexer/demultiplexer (410), inputting the forward time frequency optical signal from the first wavelength multiplexer/demultiplexer (410) into the time frequency bidirectional relay amplification unit (402) by the first OSC-band wavelength multiplexer/demultiplexer (407), carrying out forward relay amplification on the received forward time frequency optical signal by the time frequency bidirectional relay amplification unit (402), inputting the forward time frequency optical signal from the time frequency bidirectional relay amplification unit (402) into the second wavelength multiplexer/demultiplexer (412) by the second OSC-band wavelength multiplexer/demultiplexer (413), and inputting an OSC-band optical signal from the wavelength multiplexer/demultiplexer (413) into an optical fiber connected to a next relay node by the second wavelength multiplexer/demultiplexer (412); repeating the amplification process of the first relay node by a second relay node, . . . , until by the n-th relay node, inputting the OSC-band optical signal from the wavelength multiplexer/demultiplexer (413) into the second optical fiber (303) connected to the remote end by the second wavelength multiplexer/demultiplexer (412) of the n-th relay node, and receiving a forward time frequency optical signal from the second optical fiber (303) and inputting the OSC-band optical signal into the remote OSC-band wavelength multiplexer/demultiplexer (205) by the remote wavelength multiplexer/demultiplexer (206), and demultiplexing the received OSC-band optical signal to obtain a forward time frequency optical signal with a wavelength of $\lambda_2(\lambda_2, \lambda_3,$ and inputting the forward time frequency optical signal into the remote time frequency signal unit (202) by the remote OSC-band wavelength multiplexer/demultiplexer (205); wherein the time frequency signal is transmitted in a direction from the remote end to the local end in the backward transmission process, comprising: generating, a backward time frequency optical signal with a wavelength of $\lambda'_2$, or $\lambda'_2, \lambda_3$ when time transfer and frequency transfer are separated, by the remote time frequency signal unit (202), inputting the backward time frequency optical signal into the remote wavelength multiplexer/demultiplexer (206) through the remote OSC-band wavelength multiplexer/demultiplexer (205), and inputting the backward time frequency optical signal into the second optical fiber (303) by the remote wavelength multiplexer/demultiplexer (206), in each relay node, inputting the optical signal from the second optical fiber (303) into the second OSC-band wavelength multiplexer/demultiplexer (413) by the second wavelength multiplexer/demultiplexer (412), and demultiplexing the optical signal from the second wavelength multiplexer/demultiplexer (412) to obtain a backward time frequency optical signal with a wavelength of $\lambda'_2$, or $\lambda'_2, \lambda'_3$ when time transfer and frequency transfer are separated, and inputting the backward time frequency optical signal into the time frequency bidirectional relay amplification unit (402) by the second OSC-band wavelength multiplexer/demultiplexer (413); carrying out relay amplification on the received optical signal by the time frequency bidirectional relay amplification unit (402), inputting the backward time frequency optical signal from the time frequency bidirectional relay amplification unit (402) into the first wavelength multiplexer/demultiplexer (410) by the first OSC-band wavelength multiplexer/demultiplexer (407), and inputting an OSC-band optical signal from the wavelength multiplexer/demultiplexer (407) into the wavelength multiplexer/demultiplexer (412) of the previous relay node through an optical fiber by the first wavelength multiplexer/demultiplexer (410); and repeating the amplification process for n times (n≥0), and in the first relay node (401), inputting the OSC-band optical signal from the wavelength multiplexer/demultiplexer (407) into the first optical fiber (301) by the wavelength multiplexer/demultiplexer (410); and receiving the optical signal from the first optical fiber (301) and inputting OSC-band light into the OSC-band wavelength multiplexer/demultiplexer (105) by the local wavelength multiplexer/demultiplexer (106) at the local end; carrying out demultiplexing to obtain a backward time frequency optical signal having a wavelength of $\lambda'_2$, or $\lambda'_2, \lambda'_3$ when time transfer and frequency transfer are separated, inputting the backward time frequency optical signal into the local time frequency signal unit (102) by the OSC-band wavelength multiplexer/demultiplexer (105), and receiving the backward time frequency optical signal output from the local OSC-band wavelength multiplexer/demultiplexer (105) and carrying out time frequency comparison and clock synchronization by the local time frequency signal unit (102);

(2) transmitting an optical supervisory signal, further comprising the steps of generating an optical supervisory signal with a wavelength in a range of $\lambda_0$-$\lambda_1$ by the local optical supervisory signal transmitting unit (103), wherein $\lambda_0, \lambda_1$ are both within the OSC band, and the range of $\lambda_0\lambda_1$ does not contain the wavelengths $\lambda_2, \lambda_2$ of time and frequency transfer, inputting the optical supervisory signal into the local wavelength multiplexer/demultiplexer (106) through the local OSC-band wavelength multiplexer/demultiplexer (105), and inputting an optical signal from the local OSC-band wavelength multiplexer/demultiplexer (105) into the first optical fiber (301) by the local wavelength multiplexer/demultiplexer (106); carrying out relay amplification on the optical supervisory signal by in the first relay node (401), inputting the optical signal from the first optical fiber (301) into the first OSC-band wavelength multiplexer/demultiplexer (407) by the first wavelength multiplexer/demultiplexer (410), demultiplexing the optical signal from the first wavelength multiplexer/demultiplexer (410) to obtain an optical supervisory signal having a wavelength in a range of $\lambda_0\lambda_1$ and inputting the optical supervisory signal into the optical supervisory signal receiving unit (408) by the first OSC-band wavelength multiplexer/demultiplexer (407), generating an optical supervisory signal with a wavelength in a range of $\lambda_0$-$\lambda_1$ and inputting the optical supervisory signal into the second OSC-band wavelength multiplexer/demultiplexer (413) by the optical supervisory signal transmitting unit (409), inputting the optical supervisory signal generated by the optical supervisory signal transmitting unit (409) into the second wavelength multiplexer/demultiplexer (412) by the second OSC-band wavelength multiplexer/demultiplexer (413), and inputting an OSC-band optical signal from the second OSC-band wavelength multiplexer/demultiplexer (413) into the optical fiber connected to a next relay node (401) by the second wavelength multiplexer/demultiplexer (412); repeating the amplification process of the first relay node by the second relay node, . . . until by the n-th relay node, and inputting the OSC-band optical signal from the wavelength multiplexer/demultiplexer (413) into the second optical fiber (303) connected to the remote end by the second wavelength multiplexer/demultiplexer (412); receiving a forward optical signal from the second optical fiber (303) and inputting OSC-band light into the remote OSC-band wavelength multiplexer/demultiplexer (205) by the remote OSC-band wavelength multiplexer/demultiplexer (206), and demultiplexing the received OSC-band optical signal to obtain an optical supervisory signal having a wavelength in a range of $\lambda_0$-$\lambda_1$ and inputting the optical supervisory signal into a remote optical supervisory signal unit (203) by the remote OSC-band wavelength multiplexer/demultiplexer (205);

(3) transmitting a communication data signal by conducting a forward transmission when the transmission of the communication data signal is single-fiber unidirectional transmission or forward transmission and backward transmission when the transmission of the communication data signal is single-fiber bidirectional transmission, comprising conducting the forward transmission by loading the communication data signal onto an optical communication data signal band out of the OSC band by a local optical communication data unit (104), and inputting the optical communication data signal band into the first wavelength multiplexer/demultiplexer (410) of the first relay node (401) through the first optical fiber (301) by the local wavelength multiplexer/demultiplexer (106); carrying out relay amplification on the communication data signal in the first relay node by inputting an optical communication data signal from the first optical fiber (301) into the communication data relay amplification unit (411) by the first wavelength multiplexer/demultiplexer (410), processing the received optical communication data signal and inputting the processed optical communication data signal into the second wavelength multiplexer/demultiplexer (412) by the communication data relay amplification unit (411), and inputting the optical communication data signal into the first wavelength multiplexer/demultiplexer (410) of the second relay node, from an output terminal of the second wavelength multiplexer/demultiplexer (412); conducting the second relay amplification by repeating the communication data relay amplification process of the first relay node by the second relay node, . . . until by n-th relay node; inputting the optical communication data signal into the remote wavelength multiplexer/demultiplexer (206) through the second optical fiber (303) from the output terminal of the second wavelength multiplexer/demultiplexer (412) of the n-th relay node, and inputting the signal in the optical communication data band inputted from the second optical fiber (303) into the remote communication data unit (204) by the remote wavelength multiplexer/demultiplexer (206); conducting the backward transmission process of the communication data signal by loading a communication data signal onto the optical communication data signal band out of the OSC band by the remote communication data unit (204), and inputting the optical communication data signal band into the communication data relay amplification unit (411) of the n-th relay node through the second optical fiber (303) and the second wavelength multiplexer/demultiplexer (412) by the remote wavelength multiplexer/demultiplexer (206); carrying out relay amplification on the communication data signal, comprising in the n-th relay node, processing the received optical communication data signal and inputting the processed optical communication data signal into the first wavelength multiplexer/demultiplexer (410) by the communication data relay amplification unit (411), and inputting the optical communication data signal backward into the second wavelength multiplexer/demultiplexer (412) of a next relay node by the first wavelength multiplexer/demultiplexer (410); and carrying out the above communication data relay amplification process backward by all relay nodes in sequence, and in the first relay node, inputting the optical communication data signal into the local wavelength multiplexer/demultiplexer (106) through the first optical fiber (301) by the first wavelength multiplexer/demultiplexer (410), and inputting the inputted signal in the optical communication data band into the local optical communication data unit (104) by the local wavelength multiplexer/demultiplexer (106).

In the method of the present invention, the $\lambda_2$, $\lambda_3$ and $\lambda'_2$, $\lambda'_3$ are optionally equal. In the present invention, the OSC band adopted by the system is one of selectable OSC bands specified by the ITU-T Recommendation G.692, which is currently 1500 nm to 1520 nm or 1470 nm to 1490 nm or a 1310 nm band, or a new OSC band specified by future ITU-T Recommendations; and a local OSC-band wavelength multiplexer/demultiplexer, a first OSC-band wavelength multiplexer/demultiplexer, a second OSC-band wavelength multiplexer/demultiplexer and a remote OSC-band wavelength multiplexer/demultiplexer operate in a selected OSC band for multiplexing/demultiplexing of a wavelength of an optical supervisory signal and a wavelength of a time frequency transfer signal.

In the present invention, the local wavelength multiplexer/demultiplexer, the first wavelength multiplexer/demultiplexer, the second wavelength multiplexer/demultiplexer and the remote wavelength multiplexer/demultiplexer in the system are used for multiplexing/demultiplexing of the OSC band and operating light bands of the local optical communication data unit and the remote communication data unit.

In the present invention, the wavelength of the time frequency transfer signal and the wavelength of the optical supervisory signal adopted by the system are both in the OSC band, and are within non-overlapped wavelength ranges.

In the present invention, the time frequency signal and the optical supervisory signal are carried at different optical wavelengths in the OSC band, communication data is carried at a wavelength out of the OSC band, and the three signals are transmitted through one optical fiber by means of wavelength division multiplexing.

The present invention has the following technical effects:

According to the invention, different sub-bands within a standard commercial OSC band are used to transmit the time frequency signal and the optical supervisory signal, respectively, and then the time frequency signal and the optical supervisory signal are multiplexed with the optical communication data service into one optical fiber through CWDM modules in the commercial WDM optical communication system, thereby achieving the fiber-optic time frequency and data service joint transmission. The main technical effects of the present invention are as follows:

(1) according to the invention, a sub-band of the standard OSC band is used for transmitting the time frequency signal, so that the transmission of the optical supervisory signal is not influenced while no extra band resource is occupied, thereby improving the utilization rate of the wavelength resources and reducing costs;

(2) according to the invention, the wavelengths of time transfer and frequency transfer are both in a sub-band of the OSC band, and can be flexibly selected and combined so as to meet requirements of different applications and systems; and the wavelengths of transmission in both directions can be very close or even same, so that the bidirectional symmetry of the link can be guaranteed to maximum, and the precision of time and frequency transfer is improved; and (3) according to the invention, the multiplexing of the time frequency signal and the optical supervisory signal with the optical communication data service are performed by the CWDM modules in the commercial WDM optical communication system, and it is not required to replace the CWDMs in the existing communication link during implementation, so that the original communication data services are not interrupted, the implementation is facilitated, and the costs are reduced.

BRIEF DESCRIPTION OF THE DRAWINGS

FIGS. 3A to 3C are schematic diagrams showing the structure of the first embodiment of the present invention, wherein FIG. 3A is a structural schematic diagram showing a local end of the system, FIG. 3B is a structural schematic diagram showing a relay node of the system, and FIG. 3C is a structural schematic diagram showing a remote end of the system. The term "OSC" used in FIGS. 3A to 3C refers to OSC band.

Reference numbers used in the figures are as follows:
1—demultiplexing port; 2—demultiplexing port; 3—multiplexing port;

101—local end; 102—local time frequency signal unit; 103—optical supervisory signal transmitting unit; 104—optical communication data unit; 105—local OSC-band wavelength multiplexer/demultiplexer; 106—local wavelength multiplexer/demultiplexer;

201—a relay section and a remote end; 202—remote time frequency signal unit; 203—optical supervisory signal receiving unit; 204—optical communication data unit; 205—remote OSC-band wavelength multiplexer/demultiplexer; 206—remote wavelength multiplexer/demultiplexer;

301, 302, 303—optical fibers;

401—relay node; 402—time frequency bidirectional relay amplification unit; 407—first OSC-band wavelength multiplexer/demultiplexer; 408—optical supervisory signal receiving unit; 409—optical supervisory signal transmitting unit; 410—first wavelength multiplexer/demultiplexer; 411—communication data relay amplification unit; 412—second wavelength multiplexer/demultiplexer; 413—second OSC-band wavelength multiplexer/demultiplexer;

502—transmitting unit; 503—receiving unit; 504—circulator; 512—transmitting unit; 513—receiving unit; 514—circulator.

DETAILED DESCRIPTION OF THE INVENTION

Figure 1:
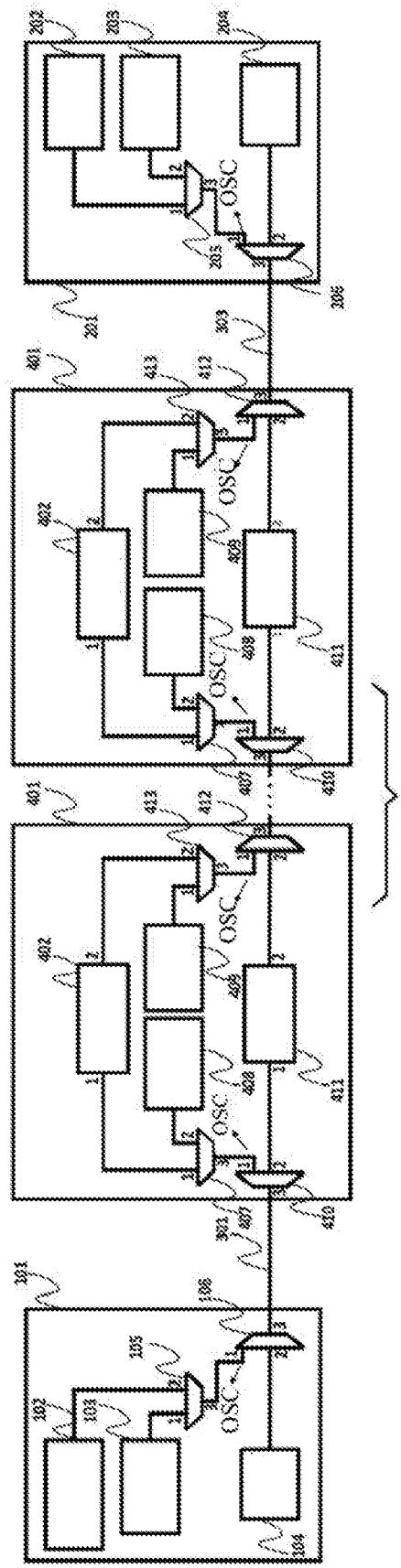
FIG. 1 is a block diagram showing the fiber-optic time frequency and data joint transmission system of the present invention. The term "OSC" used in FIG. 1 refers to OSC band.

As shown in FIG. 1, the fiber-optic time frequency and data joint transmission system of the present invention comprises a local end 101, a relay section and a remote end 201, wherein the relay section is formed by n relay nodes 401 which are connected in series through optical fibers, wherein n≥0; the local end 101 is connected to the a first relay node 401 through a first optical fiber 301, and an n-th relay node is connected to the remote end 201 through a second optical fiber 303;

the local end 101 comprises a local time frequency signal unit 102, a local optical supervisory signal transmitting unit 103, a local optical communication data unit 104, a local OSC-band wavelength multiplexer/demultiplexer 105 and a local wavelength multiplexer/demultiplexer 106, wherein the local time frequency signal unit 102 is connected to a demultiplexing port 2 of the local OSC-band wavelength multiplexer/demultiplexer 105, the local optical supervisory signal transmitting unit 103 is connected to a demultiplexing port 1 of the local OSC-band wavelength multiplexer/demultiplexer 105, a multiplexing port 3 of the OSC-band wavelength multiplexer/demultiplexer 105 is connected to a demultiplexing port 1 of the local wavelength multiplexer/demultiplexer 106, the local optical communication data unit 104 is connected to a demultiplexing port 2 of the local wavelength multiplexer/demultiplexer 106, and the multiplexing port 3 of the local wavelength multiplexer/demultiplexer 106 is connected to one end of the first optical fiber 301;

each relay node 401 comprises a first wavelength multiplexer/demultiplexer 410, a communication data relay amplification unit 411, a first OSC-band wavelength multiplexer/demultiplexer 407, a time frequency bidirectional relay amplification unit 402, an optical supervisory signal receiving unit 408, an optical supervisory signal transmitting unit 409, and a second OSC-band wavelength multiplexer/demultiplexer 413 and a second wavelength multiplexer/demultiplexer 412, wherein a multiplexing port 3 of the first wavelength multiplexer/demultiplexer 410 is connected to the other end of the first optical fiber 301, a demultiplexing port 2 of the first wavelength multiplexer/demultiplexer 410 is connected to a port 1 of the communication data relay amplification unit 411, a demultiplexing port 1 of the first wavelength multiplexer/demultiplexer 410 is connected to a multiplexing port 3 of the first OSC-band wavelength multiplexer/demultiplexer 407, a demultiplexing port 2 of the first OSC-band wavelength multiplexer/demultiplexer 407 is connected to the optical supervisory signal receiving unit 408, and a demultiplexing port 1 of the first OSC-band wavelength multiplexer/demultiplexer 407 is connected to a port 1 of the time frequency bidirectional relay amplification unit 402; a port 2 of the time frequency bidirectional relay amplification unit 402 is connected to a demultiplexing port 2 of the second OSC-band wavelength multiplexer/demultiplexer 413, the optical supervisory signal transmitting unit 409 is connected to a demultiplexing port 1 of the second OSC-band wavelength multiplexer/demultiplexer 413, a multiplexing port 3 of the second OSC-band wavelength multiplexer/demultiplexer 413 is connected to a demultiplexing port 1 of the second wavelength multiplexer/demultiplexer 412, a port 2 of the communication data relay amplification unit 411 is connected to a demultiplexing port 2 of the wavelength multiplexer/demultiplexer 412, and a multiplexing port 3 of the second wavelength multiplexer/demultiplexer 412 is connected to the multiplexing port 3 of the first wavelength multiplexer/demultiplexer 2 of a next relay node 401 through an optical fiber 302; the n relay amplification nodes 401 of the relay section are sequentially connected through optical fibers; and the multiplexing port 3 of the second wavelength multiplexer/demultiplexer 412 of the n-th relay node is connected to the second optical fiber 303; and the remote end 201 comprises a remote time frequency signal unit 202, a remote optical supervisory signal receiving unit 203, a remote communication data unit 204, a remote OSC-band wavelength multiplexer/demultiplexer 205 and a remote wavelength multiplexer/demultiplexer 206, wherein the remote time frequency signal unit 202 is connected to a demultiplexing port 1 of the remote OSC-band wavelength multiplexer/demultiplexer 205, the remote optical supervisory signal receiving unit 203 is connected to a demultiplexing port 2 of the remote OSC-band wavelength multiplexer/demultiplexer 205, a multiplexing port 3 of the remote OSC-band wavelength multiplexer/demultiplexer 205 is connected to a demultiplexing port 1 of the remote wavelength multiplexer/demultiplexer 206, the remote communication data unit 204 is connected to a demultiplexing port 2 of the remote wavelength multiplexer/demultiplexer 206, and a multiplexing port 3 of the remote wavelength multiplexer/demultiplexer 206 is connected to the other end of the second optical fiber 303.

An OSC band adopted by the system is one of selectable OSC bands specified by ITU-T Recommendation G.692 which is currently 1500 nm to 1520 nm or 1470 nm to 1490 nm or a 1310 nm band, or a new OSC band specified by future ITU-T Recommendations; and the local OSC-band wavelength multiplexer/demultiplexer 105, the first OSC-band wavelength multiplexer/demultiplexer 407, the second OSC-band wavelength multiplexer/demultiplexer 413 and the remote OSC-band wavelength multiplexer/demultiplexer 205 operate in a selected OSC band for multiplexing/demultiplexing of an optical supervisory signal wavelength and a time frequency transfer signal wavelength.

The local wavelength multiplexer/demultiplexer 106, the first wavelength multiplexer/demultiplexer 410, the second wavelength multiplexer/demultiplexer 412 and the remote wavelength multiplexer/demultiplexer 206 in the system are used for multiplexing/demultiplexing of the OSC band and operating optical bands of the local optical communication data unit 104 and the remote communication data unit 204.

The wavelength of the time frequency transfer signal and the wavelength of the optical supervisory signal adopted by the system are both in the OSC band, and are within non-overlapped wavelength ranges.

The time frequency signal and the optical supervisory signal are carried at different optical wavelengths in the OSC band, communication data is carried at a wavelength out of the OSC band, and the three signals are transmitted through one optical fiber by means of wavelength division multiplexing.

A time frequency and data joint transmission method using the above fiber-optic time frequency and data joint transmission system, is featured in that, time and frequency transfer in the method is carried out either in a bidirectional one-fiber one-wavelength transmission manner or in a bidirectional one-fiber multi-wavelength transmission manner, and the method comprises the following steps:

(I) transmission of a time frequency signal, including forward transmission and backward transmission:

(1) forward transmission, in which the time frequency signal is transmitted in a direction from a local end to a remote end, a forward transmission process of the time frequency signal including: (a) a local time frequency signal unit 102 generates a forward time frequency optical signal having a wavelength of $\lambda_2(\lambda_2, \lambda_2$, when time transfer and frequency transfer are separated), and the forward time frequency optical signal is transmitted to a first optical fiber 301 through a local OSC-band wavelength multiplexer/demultiplexer 105 and a local wavelength multiplexer/demultiplexer 106; (b) a relay amplification process, including: an amplification process is carried out by a first relay node, including: a first wavelength multiplexer/demultiplexer 410 inputs the optical signal from the first optical fiber 301 into a first OSC-band wavelength multiplexer/demultiplexer 407, the first OSC-band wavelength multiplexer/demultiplexer 407 inputs the forward time frequency optical signal from the first wavelength multiplexer/demultiplexer 410 into a time frequency bidirectional relay amplification unit 402, the time frequency bidirectional relay amplification unit 402 carries out forward relay amplification on the received forward time frequency optical signal, the second OSC-band wavelength multiplexer/demultiplexer 413 inputs the forward time frequency optical signal from the time frequency bidirectional relay amplification unit 402 into a second wavelength multiplexer/demultiplexer 412, and the second wavelength multiplexer/demultiplexer 421 inputs an OSC-band optical signal from the wavelength multiplexer/demultiplexer 413 into an optical fiber connected to a next relay node; the amplification process of the first relay node is repeated by a second relay node; . . . ; and the amplification process of the first relay node is repeated by an n-th relay node, and the second wavelength multiplexer/demultiplexer 412 of the n-th relay node inputs the optical signal in the OSC band from the wavelength multiplexer/demultiplexer 413 into a second optical fiber 303 connected to the remote end; (c) a remote wavelength multiplexer/demultiplexer 206 receives a forward time frequency optical signal from the second optical fiber 303 and inputs OSC-band light into a remote OSC-band wavelength multiplexer/demultiplexer 205, and the remote OSC-band wavelength multiplexer/demultiplexer 205 demultiplexes the received OSC-band optical signal to obtain a forward time frequency optical signal having a wavelength of $\lambda_2(\lambda_2, \lambda_3)$ and inputs the forward time frequency optical signal into a remote time frequency signal unit 202;

(2) a backward transmission process of the time frequency signal, in which the time frequency signal is transmitted in a direction from the remote end to the local end, including: (a) the remote time frequency signal unit 202 generates a backward time frequency optical signal with a wavelength of $\lambda_2'(\lambda_2', \lambda_3'$, when time transfer and frequency transfer are separated), the backward time frequency optical signal is inputted into the remote wavelength multiplexer/demultiplexer 206 through the remote OSC-band wavelength multiplexer/demultiplexer 205, and the remote wavelength multiplexer/demultiplexer 206 inputs the backward time frequency optical signal into the second optical fiber 303; (b) in the n-th relay node, the second wavelength multiplexer/demultiplexer 412 inputs the optical signal from the second optical fiber 303 into the second OSC-band wavelength multiplexer/demultiplexer 413, and the second OSC-band wavelength multiplexer/demultiplexer 413 demultiplexes the optical signal from the second wavelength multiplexer/demultiplexer 412 to obtain a backward time frequency optical signal having a wavelength of $\lambda_2'(\lambda_2', \lambda_3'$, when time transfer and frequency transfer are separated) and inputs the backward time frequency optical signal into the time frequency bidirectional relay amplification unit 402; the time frequency bidirectional relay amplification unit 402 carries out relay amplification on the received optical signal, the first OSC-band wavelength multiplexer/demultiplexer 407 inputs the backward time frequency optical signal from the time frequency bidirectional relay amplification unit 402 into the first wavelength multiplexer/demultiplexer 410, and the first wavelength multiplexer/demultiplexer 410 inputs an OSC-band optical signal from the wavelength multiplexer/demultiplexer 407 into the wavelength multiplexer/demultiplexer 412 of a previous relay node through an optical fiber; and the above amplification process is repeated for n times (n≥0), and in the first relay node 401, the wavelength multiplexer/demultiplexer 410 inputs the OSC-band optical signal from the wavelength multiplexer/demultiplexer 407 into the first optical fiber 301; and (c) the local wavelength multiplexer/demultiplexer 106 receives the optical signal from the first optical fiber 301 and inputs OSC-band light into the OSC-band wavelength multiplexer/demultiplexer 105; the OSC-band wavelength multiplexer/demultiplexer 105 carries out demultiplexing to obtain a backward time frequency optical signal having a wavelength of $\lambda_2'(\lambda_2', \lambda_3'$, when time transfer and frequency transfer are separated; and $\lambda_2', \lambda_3'$ are possible to be equal to $\lambda_2, \lambda_3$) and inputs the backward time frequency optical signal into the local time frequency signal unit 102, and the local time frequency signal unit 102 receives the backward time frequency optical signal output from the local OSC-band wavelength multiplexer/demultiplexer 105 and carries out time frequency comparison and clock synchronization;

(II). transmission of an optical supervisory signal, including the following steps that:

(1) a local optical supervisory signal transmitting unit 103 generates an optical supervisory signal with a wavelength in a range of $\lambda_0$-$\lambda_1$, wherein $\lambda_0$, $\lambda_1$ are both within the OSC band, and the range of $\lambda_0$-$\lambda_1$ does not contain the wavelengths $\lambda_2, \lambda_3$ of time and frequency transfer; and the optical supervisory signal is inputted into the local wavelength multiplexer/demultiplexer 106 through the local OSC-band wavelength multiplexer/demultiplexer 105, and the local wavelength multiplexer/demultiplexer 106 inputs an optical signal from the local OSC-band wavelength multiplexer/demultiplexer 105 into the first optical fiber 301;

(2) a relay amplification process is carried out on the optical supervisory signal, including: in the first relay node 401, the first wavelength multiplexer/demultiplexer 410 inputs the optical signal from the first optical fiber 301 into the first OSC-band wavelength multiplexer/demultiplexer 407, the first OSC-band wavelength multiplexer/demultiplexer 407 demultiplexes the optical signal from the first wavelength multiplexer/demultiplexer 410 to obtain an optical supervisory signal having a wavelength in a range of $\lambda_0$-$\lambda_1$, and inputs the optical supervisory signal into the optical supervisory signal receiving unit 408, an optical supervisory signal transmitting unit 409 generates an optical supervisory signal with a wavelength in a range of $\lambda_0$-$\lambda_1$ and inputs the optical supervisory signal into the second OSC-band wavelength multiplexer/demultiplexer 413, the second OSC-band wavelength multiplexer/demultiplexer 413 inputs the optical supervisory signal generated by the optical supervisory signal transmitting unit 409 into the second wavelength multiplexer/demultiplexer 412, and the second wavelength multiplexer/demultiplexer 412 inputs an OSC-band optical signal from the second OSC-band wavelength multiplexer/demultiplexer 413 into an optical fiber connected to a next relay node 401;

the amplification process of the first relay node is repeated by the second relay node; . . . ; and the amplification process of the first relay node is repeated by the n-th relay node, and the second wavelength multiplexer/demultiplexer 412 of the n-th relay node inputs the OSC-band optical signal from the wavelength multiplexer/demultiplexer 413 into the second optical fiber 303 connected to the remote end;

(3) the remote wavelength multiplexer/demultiplexer 206 receives a forward optical signal from the second optical fiber 303 and inputs OSC-band light into the remote OSC-band wavelength multiplexer/demultiplexer 205, and the remote OSC-band wavelength multiplexer/demultiplexer 205 demultiplexes the received OSC-band optical signal to obtain an optical supervisory signal having a wavelength in a range of $\lambda_0$-$\lambda_1$ and inputs the optical supervisory signal into the remote the optical supervisory signal unit 203; and (III). transmission of a communication data signal, which is either single-fiber unidirectional transmission or single-fiber bidirectional transmission, including: forward transmission when the transmission of the communication data signal is single-fiber unidirectional transmission; or forward transmission and backward transmission when the transmission of the communication data signal is single-fiber bidirectional transmission, wherein (1) a forward transmission process of the communication data signal comprises:
(a) a local optical communication data unit 104 loads the communication data signal onto an optical communication data signal band out of the OSC band, and the local wavelength multiplexer/demultiplexer 106 inputs the optical communication data signal band into the first wavelength multiplexer/demultiplexer 410 of the first relay node through the first optical fiber 301; (b) relay amplification is carried out on the communication data signal, including: first relay amplification: in the first relay node, the first wavelength multiplexer/demultiplexer 410 inputs an optical communication data signal from the first optical fiber 301 into a communication data relay amplification unit 411, the communication data relay amplification unit 411 processes the received optical communication data signal and inputs the processed optical communication data signal into the second wavelength multiplexer/demultiplexer 412, and the optical communication data signal is inputted into the first wavelength multiplexer/demultiplexer 410 of a next relay node, namely the second relay node, from an output terminal of the second wavelength multiplexer/demultiplexer 412;

second relay amplification: the above communication data relay amplification process of the first relay node is repeated by the second relay node; . . . ; and n-th relay amplification: the communication data relay amplification process of the first relay node is repeated by the n-th relay node; and (c) the optical communication data signal is inputted into the remote wavelength multiplexer/demultiplexer 206 through the second optical fiber 303 from the output terminal of the second wavelength multiplexer/demultiplexer 412 of the n-th relay node, and the remote wavelength multiplexer/demultiplexer 206 inputs the signal in the optical communication data band inputted from the second optical fiber 303 into the remote communication data unit 204;

(2) a backward transmission process of the communication data signal comprises: (a) a remote communication data unit 204 loads a communication data signal onto the optical communication data signal band out of the OSC band, and the remote wavelength multiplexer/demultiplexer 206 inputs the optical communication data signal band into the communication data relay amplification unit 411 of the n-th relay node through the second optical fiber 303 and the second wavelength multiplexer/demultiplexer 412; (b) relay amplification is carried out on the communication data signal, including:

in the n-th relay node, the communication data relay amplification unit 411 processes the received optical communication data signal and inputs the processed optical communication data signal into the first wavelength multiplexer/demultiplexer 410, and the first wavelength multiplexer/demultiplexer 410 inputs the optical communication data signal backward into the second wavelength multiplexer/demultiplexer 412 of a next relay node; and (c) all relay nodes carry out the above communication data relay amplification process backward in sequence, and in the first relay node, the first wavelength multiplexer/demultiplexer 410 inputs the optical communication data signal into the local wavelength multiplexer/demultiplexer 106 through the first optical fiber 301, and the local wavelength multiplexer/demultiplexer 106 inputs the inputted signal in the optical communication data band into the local optical communication data unit 104.

$\lambda_2$, $\lambda_3$ and $\lambda_2$', $\lambda_3$' are possible to be equal.

Each of the first and second embodiments described below only comprises one relay node, but it is possible to comprise multiple or zero relay nodes. The specific embodiments described below provides two divisions of the OSC band of 1500 nm to 1520 nm. However, the scope of the present invention should not be limited in the regard.

Figure 2A:
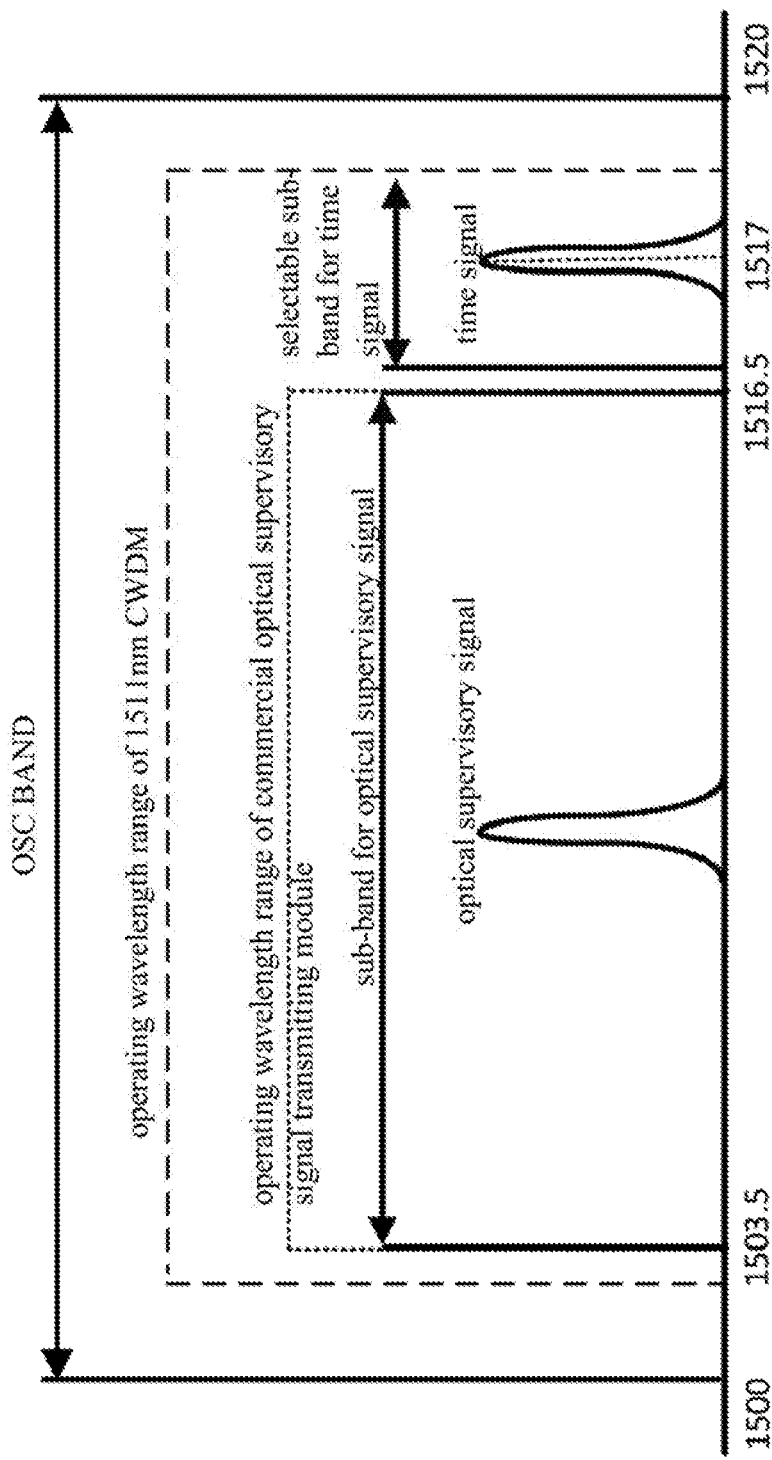
FIG. 2A is a diagram showing the OSC band division in a first embodiment of the present invention.

In the first embodiment of the present invention, wavelengths within the OSC band that are not covered by commercial optical supervisory signal transmission optical modules are used to transmit bidirectional time signals. In the embodiment, the division of the OSC band is as shown in FIG. 2A. 1500 nm to 1520 nm is one of the selectable OSC bands specified by ITU-T Recommendation G.692. The wavelength of an optical supervisory signal is within a band of 1503.5 nm to 1516.5 nm. The sub-band (1503.5 nm to 1516.5 nm) overlaps the operating wavelength range of most existing commercial optical supervisory signaling optical modules. Both a forward time signal and a backward time signal are carried at a wavelength of 1517 nm, which is not covered by the sub-band of the optical supervisory signal (1503.5 nm to 1516.5 nm), within the operating wavelength range (1503.5 nm to 1518.5 nm as specified by the recommendation) of 1511 nm CWDM modules (i.e., a local wavelength multiplexer/demultiplexer 106, a first wavelength multiplexer/demultiplexer 410, a second wavelength multiplexer/demultiplexer 412, a remote wavelength multiplexer/demultiplexer 206), and the bidirectional transmission is achieved through one-fiber one-wavelength bidirectional time division multiplexing. The wavelength of a communication data signal lies in a C-band (1530 nm to 1565 nm).

Figure 3A:
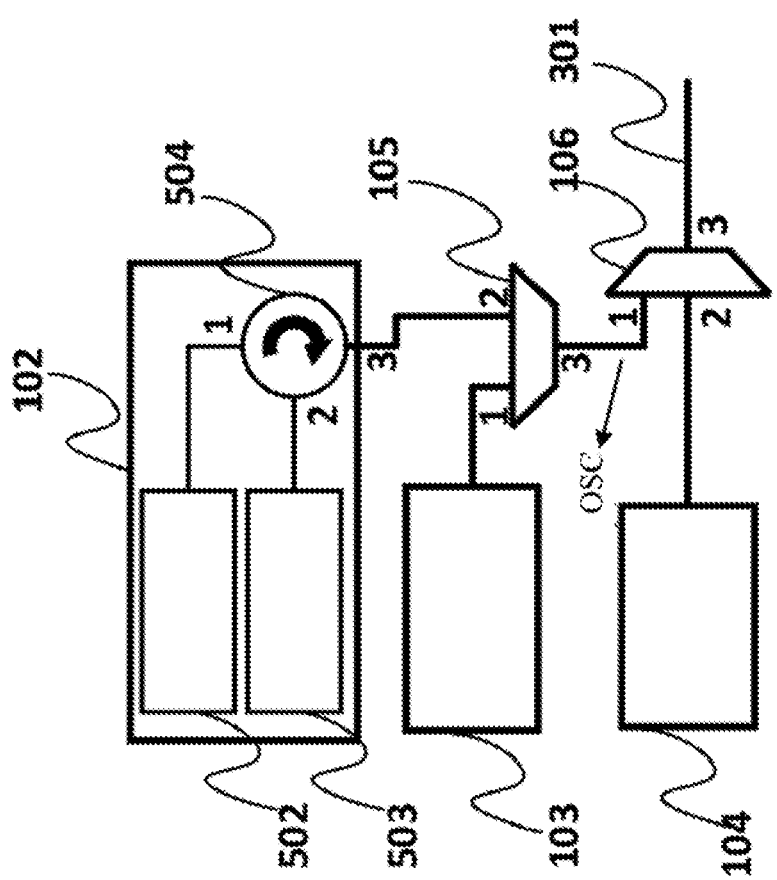

As shown in FIG. 3A, in the structure of the local end of the fiber-optic time and data joint transmission system in the first embodiment of the present invention, the local end 101 comprises a local time signal unit 102, an optical supervisory signal transmitting unit 103, a local optical communication data unit 104, a local OSC-band wavelength multiplexer/demultiplexer 105, and a local wavelength multiplexer/demultiplexer 106. The local time signal unit 102 comprises a transmitting unit 502, a receiving unit 503, and a circulator 504. The transmitting unit 502 of the local time signal unit 102 is connected to a port 1 of the circulator 504, the receiving unit 503 is connected to a port 2 of the circulator 504, and a port 3 of the circulator 504 is connected to the demultiplexing port 2 of the OSC-band wavelength multiplexer/demultiplexer 105. The optical supervisory signal transmitting unit 103 is connected to a demultiplexing port 1 of the OSC-band wavelength multiplexer/demultiplexer 105, a multiplexing port 3 of the OSC-band wavelength multiplexer/demultiplexer 105 is connected to a demultiplexing port 1 (with an operating wavelength range of 1503.5 nm to 1518.5 nm) of the local wavelength multiplexer/demultiplexer 106, and the local optical communication data unit 104 is connected to a demultiplexing port 2 (with an operating wavelength range of the C-band) of the local wavelength multiplexer/demultiplexer 106. A multiplexing port 3 of the local wavelength multiplexer/demultiplexer 106 is connected to a first optical fiber 301. The local OSC-band wavelength multiplexer/demultiplexer 105 is used for carrying out multiplexing on optical supervisory signals at 1503.5 nm to 1516.5 nm and forward time signals at 1517 nm, and also used for demultiplexing of backward time signals at 1517 nm from the OSC band. The local wavelength multiplexer/demultiplexer 106 is used for carrying out multiplexing and demultiplexing on optical signals in the OSC band and communication data signals in the C band.

The transmitting unit 502 of the local time signal unit 102 generates a forward time optical signal at a wavelength of 1517 nm, and the transmitting unit 502 stops transmitting the optical signal after the forward time optical signal at the wavelength of 1517 nm is completed. The forward time optical signal is inputted into the local OSC-band wavelength multiplexer/demultiplexer 105 through the circulator 504. The local optical supervisory signal transmitting unit 103 generates an optical supervisory signal having a wavelength in a range of 1503.5 nm to 1516.5 nm and inputs the optical supervisory signal into the local OSC-band wavelength multiplexer/demultiplexer 105. The local OSC-band wavelength multiplexer/demultiplexer 105 carries out multiplexing on the forward time optical signal from the circulator 504 and the optical supervisory signal from the optical supervisory signal transmitting unit 103 and inputs a multiplex signal into the local wavelength multiplexer/demultiplexer 106. The local optical communication data unit 104 loads a communication data signal onto the C-band and inputs the communication data signal into the local wavelength multiplexer/demultiplexer 106. The local wavelength multiplexer/demultiplexer 106 carries out multiplexing on the optical signal from the local OSC-band wavelength multiplexer/demultiplexer 105 and the communication data signal from the local optical communication data unit 104 and inputs a multiplex signal into the first optical fiber 301.

The local wavelength multiplexer/demultiplexer 106 of the local end 101 receives a backward optical signal from the first optical fiber 301, and the local wavelength multiplexer/demultiplexer 106 carries out demultiplexing to obtain an OSC-band backward optical signal and inputs the backward optical signal into the wavelength multiplexer/demultiplexer 105. The wavelength multiplexer/demultiplexer 105 carries out demultiplexing to obtain a backward time optical signal having a wavelength of 1517 nm and inputs the backward time optical signal into the circulator 504, and the circulator 504 inputs the backward time optical signal into the receiving unit 503 of the local time signal unit 102. The receiving unit 503 receives a backward time optical signal having a wavelength of 1517 nm, and carries out time comparison and clock synchronization.

Figure 3B:
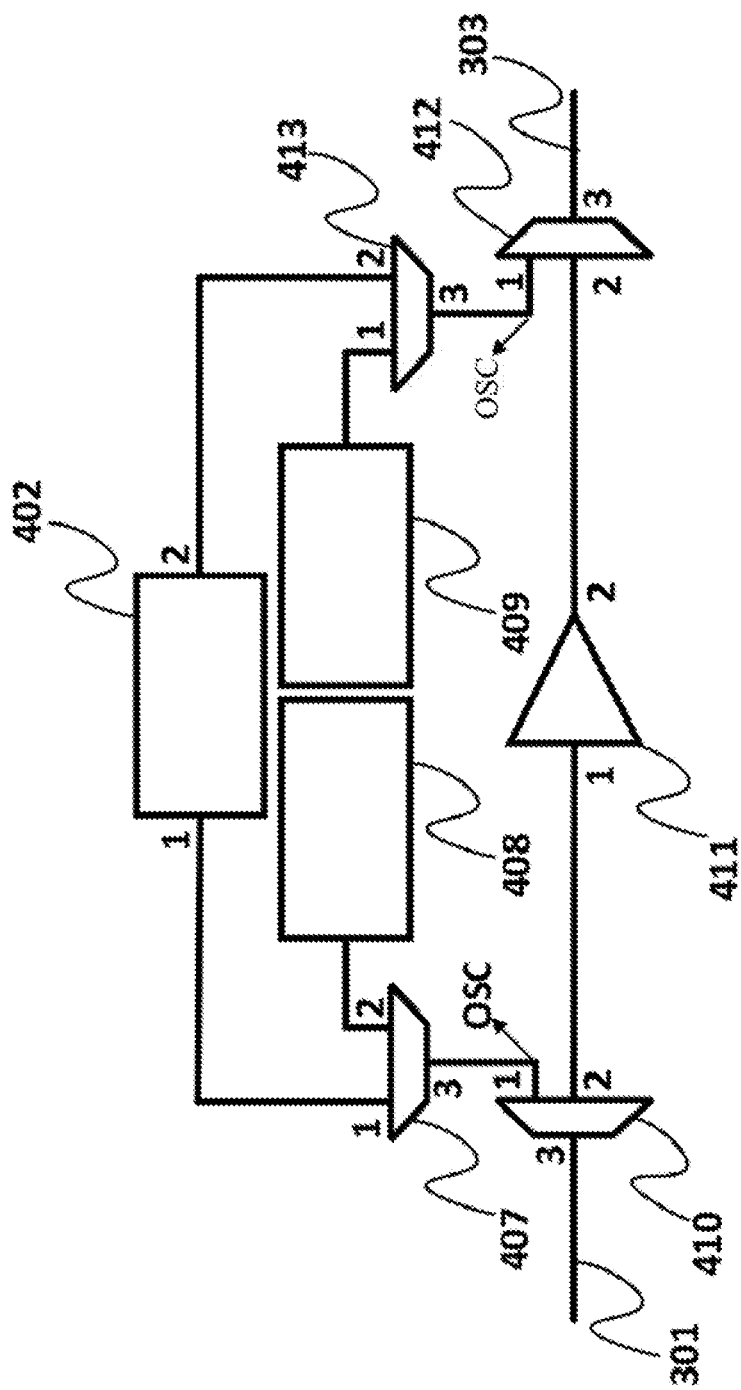

As shown in FIG. 3B, in the structure of the relay node of the fiber-optic time and data joint transmission system in the first embodiment of the present invention, the relay node 401 comprises a first wavelength multiplexer/demultiplexer 410, an optical amplifier 411, a first OSC-band wavelength multiplexer/demultiplexer 407, a bidirectional relay amplification unit 402, an optical supervisory signal receiving unit 408, an optical supervisory signal transmitting unit 409, a second OSC-band wavelength multiplexer/demultiplexer 413, and a second wavelength multiplexer/demultiplexer 412. The optical amplifier 411 is a C-band unidirectional optical amplifier that unidirectionally amplifies forward-transmitted C-band optical communication data. The optical amplifier 411 may also be a C-band bidirectional optical amplifier supporting one-fiber bidirectional data transmission. The bidirectional relay amplification unit 402 adopts an fiber-optic time transfer single-fiber bidirectional relay and optical amplifier (referring to Chinese Patent Application No. CN201610073321.3 filed on Feb. 2, 2016 and Chinese Patent Application No. CN201811440812.2 filed on Nov. 29, 2018), supporting one-fiber one-wave bidirectional time division multiplexing transmission. The first OSC-band wavelength multiplexer/demultiplexer 407 and the second wavelength multiplexer/demultiplexer 413 are used for carrying out multiplexing and demultiplexing on optical supervisory signals at 1503.5 nm to 1516.5 nm and forward time signals at 1517 nm, and also used for demultiplexing of backward time signals at 1517 nm from the OSC band. The first wavelength multiplexer/demultiplexer 410 and the second wavelength multiplexer/demultiplexer 412 are used for carrying out multiplexing and demultiplexing on optical signals in the OSC band and communication data signals in the C-band. For each of the first wavelength multiplexer/demultiplexer 410 and the second wavelength multiplexer/demultiplexer 412, the port 1 has an operating wavelength range of 1503.5 nm to 1518.5 nm, and the port 2 has an operating wavelength range of the C-band.

An optical signal from the first optical fiber 301 is demultiplexed into an OSC-band optical signal and a C-band optical signal through the first wavelength multiplexer/demultiplexer 410 of the relay node 401. The OSC-band optical signal is demultiplexed into a forward time optical signal having a wavelength of 1517 nm and an optical supervisory signal having a wavelength in the range of 1503.5 nm to 1516.5 nm through the first OSC-band wavelength multiplexer/demultiplexer 407. The forward time optical signal having the wavelength of 1517 nm is inputted into the bidirectional relay amplification unit 402 to be subjected to relay amplification and then inputted into the second OSC-band wavelength multiplexer/demultiplexer 413. The optical supervisory signal having the wavelength in the range of 1503.5 nm to 1516.5 nm is inputted into the optical supervisory signal receiving unit 408 to be processed. The optical supervisory signal emitting unit 409 generates an optical supervisory signal having a wavelength in a range of 1503.5 nm to 1516.5 nm and inputs the optical supervisory signal into the second OSC-band wavelength multiplexer/demultiplexer 413. The second OSC-band wavelength multiplexer/demultiplexer 413 carries out multiplexing on the forward time optical signal from the bidirectional relay amplification unit 402 and the optical supervisory signal from the optical supervisory signal transmitting unit 409, and inputting a multiplex signal into the second wavelength multiplexer/demultiplexer 412. The C-band optical communication data signal obtained by demultiplexing of the first wavelength multiplexer/demultiplexer 410 is optically amplified by the optical amplifier 411 and then inputted into the second wavelength multiplexer/demultiplexer 412. The second wavelength multiplexer/demultiplexer 412 multiplexes the OSC-band optical signal from the multiplexer/demultiplexer 413 and the optical communication data signal from the optical amplifier 411 and inputs a multiplex signal into the second optical fiber 303.

An optical signal from the second optical fiber 303 is demultiplexed to obtain an OSC-band optical signal through the second wavelength multiplexer/demultiplexer 412 of the relay node 401, and the OSC-band optical signal is inputted into the second OSC-band wavelength multiplexer/demultiplexer 413. The second OSC-band wavelength multiplexer/demultiplexer 413 demultiplexes the optical signal from the second wavelength multiplexer/demultiplexer 412 to obtain a backward time optical signal having a wavelength of 1517 nm and inputs the backward time optical signal into the bidirectional relay amplification unit 402. The bidirectional relay amplification unit 402 performs backward relay amplification on the received backward time optical signal having the wavelength of 1517 nm and inputs the backward time optical signal into the first OSC-band wavelength multiplexer/demultiplexer 407. The first OSC-band wavelength multiplexer/demultiplexer 407 inputs the backward time optical signal from the bidirectional relay amplification unit 402 into the first wavelength multiplexer/demultiplexer 410, and the first wavelength multiplexer/demultiplexer 410 inputs the OSC-band optical signal from the multiplexer/demultiplexer 407 into the first optical fiber 301.

Figure 3C:
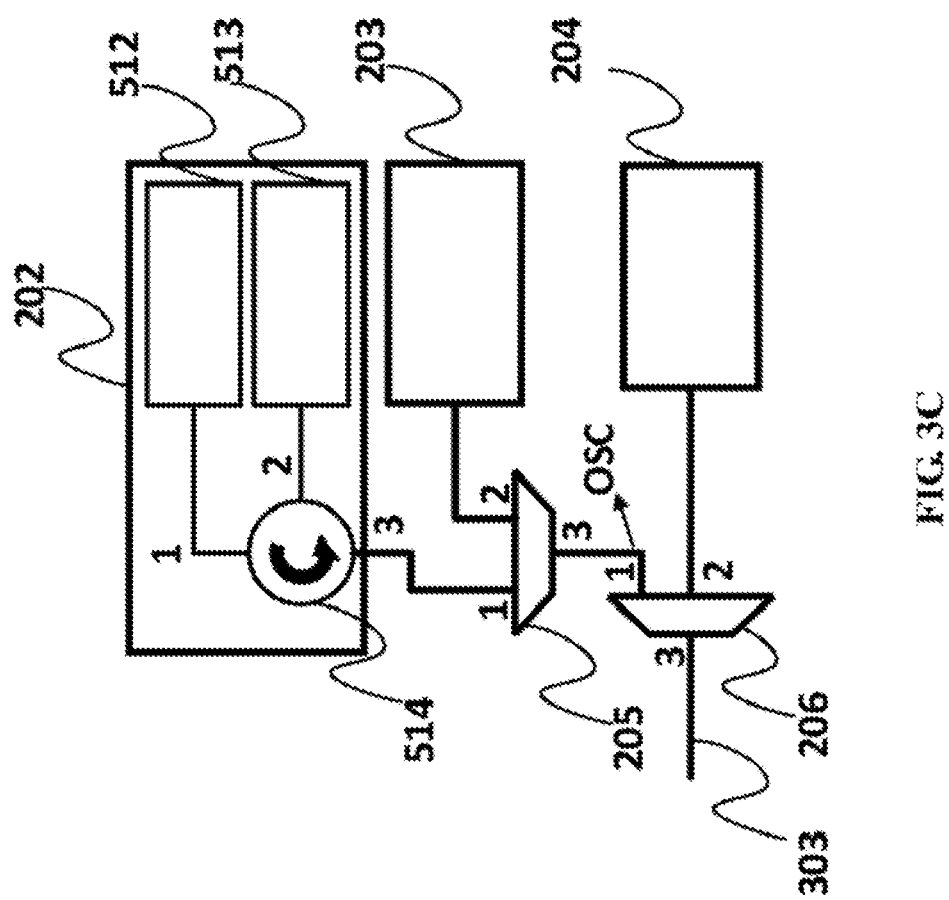

As shown in FIG. 3C, in the structure of the remote end of the fiber-optic time and data joint transmission system in the embodiment, the remote end 201 comprises a remote time signal unit 202, a remote optical supervisory signal receiving unit 203, a remote communication data unit 204, a remote wavelength multiplexer/demultiplexer 206 and a remote OSC-band wavelength multiplexer/demultiplexer 205. The remote time signal unit 202 comprises a transmitting unit 512, a receiving unit 513, and a circulator 514. The transmitting unit 512 of the remote time signal unit 202 is connected to a port 1 of the circulator 514, the receiving unit 513 is connected to a port 2 of the circulator 514, and a port 2 of the circulator 514 is connected to a demultiplexing port 1 of the remote OSC-band wavelength multiplexer/demultiplexer 205. The remote optical supervisory signal receiving unit 203 is connected to a demultiplexing port 2 of the remote OSC-band wavelength multiplexer/demultiplexer 205. A multiplexing port 3 of the OSC-band wavelength multiplexer/demultiplexer 205 is connected to a demultiplexing port 1 (with an operating wavelength range of 1503.5 nm to 1518.5 nm) of the remote wavelength multiplexer/demultiplexer 206, and the remote optical communication data unit 204 is connected to a demultiplexing port 2 (with an operating wavelength range of the C-band) of the remote wavelength multiplexer/demultiplexer 206. A multiplexing port 3 of the remote wavelength multiplexer/demultiplexer 206 is connected to the second optical fiber 303. The remote OSC-band wavelength multiplexer/demultiplexer 205 is used for carrying out demultiplexing on optical supervisory signals at 1503.5 nm to 1516.5 nm and forward time signals at 1517 nm, and also used for multiplexing backward time signals at 1517 nm into the OSC band. The remote wavelength multiplexer/demultiplexer 206 is used for carrying out multiplexing and demultiplexing on OSC-band optical signals and C-band communication data signals.

A forward optical signal from the second optical fiber 303 is demultiplexed into an OSC-band forward optical signal and a C-band communication data signal through the remote wavelength multiplexer/demultiplexer 206 of the remote node. The OSC-band optical signal from the remote wavelength multiplexer/demultiplexer 206 is demultiplexed into a forward time optical signal having a wavelength of 1517 nm and an optical supervisory signal having a wavelength in the range of 1503.5 nm to 1516.5 nm through the remote OSC-band wavelength multiplexer/demultiplexer 205. The forward time optical signal from the wavelength multiplexer/demultiplexer 205 is inputted into the receiving unit 513 of the remote time signal unit 202 through the circulator 514, and the receiving unit 513 processes the received forward time optical signal having the wavelength of 1517 nm. The optical supervisory signal from the wavelength multiplexer/demultiplexer 205 is inputted into the remote optical supervisory signal receiving unit 203, and the remote optical supervisory signal receiving unit 203 processes the received optical supervisory signal having the wavelength in the range of 1503.5 nm to 1516.5 nm. The C-band communication data signal from the remote wavelength multiplexer/demultiplexer 206 is inputted into the remote communication data unit 204, and the remote communication data unit 204 processes the received communication data signal.

After the receiving unit 513 receives the forward time optical signal having the wavelength of 1517 nm and a delay for a period of time has elapsed (ensuring that a forward time signal and a backward time signal both having the wavelength of 1517 nm do not simultaneously exist on the optical fiber link), the transmitting unit 512 generates a backward time optical signal having a wavelength of 1517 nm. The backward time signal is inputted into the remote OSC-band wavelength multiplexer/demultiplexer 205 through the circulator 514, and the remote OSC-band wavelength multiplexer/demultiplexer 205 inputs the backward time signal having the wavelength of 1517 nm into the remote wavelength multiplexer/demultiplexer 206. The remote wavelength multiplexer/demultiplexer 206 inputs the backward time signal into the second optical fiber 303.

In the first embodiment, the time signal is carried at a wavelength of 1517 nm, however, the time signal may also be carried at any wavelength in the OSC band excluding the range of 1503.5 nm to 1516.5 nm, such as 1518 nm, 1519 nm, etc. In the first embodiment, both the forward time signal and the backward time signal are carried at the wavelength of 1517 nm, i.e., the time signals are transmitted through one-fiber one-wavelength bidirectional time division multiplexing. However, the forward time signal and the backward time signal may also be carried at any different wavelengths in the OSC band excluding the range of 1503.5 nm to 1516.5 nm, for example, the forward time signal is carried at the wavelength of 1518 nm, and the backward time signal is carried at the wavelength of 1519 nm, i.e., the time signals are transmitted through one-fiber multi-wavelength bidirectional wavelength division multiplexing. In this embodiment, wavelengths within the OSC band that are not covered by commercial optical supervisory signal transmission optical modules may also be used for transmission of frequency signals, or joint transmission of time and frequency signals.

Figure 2B:
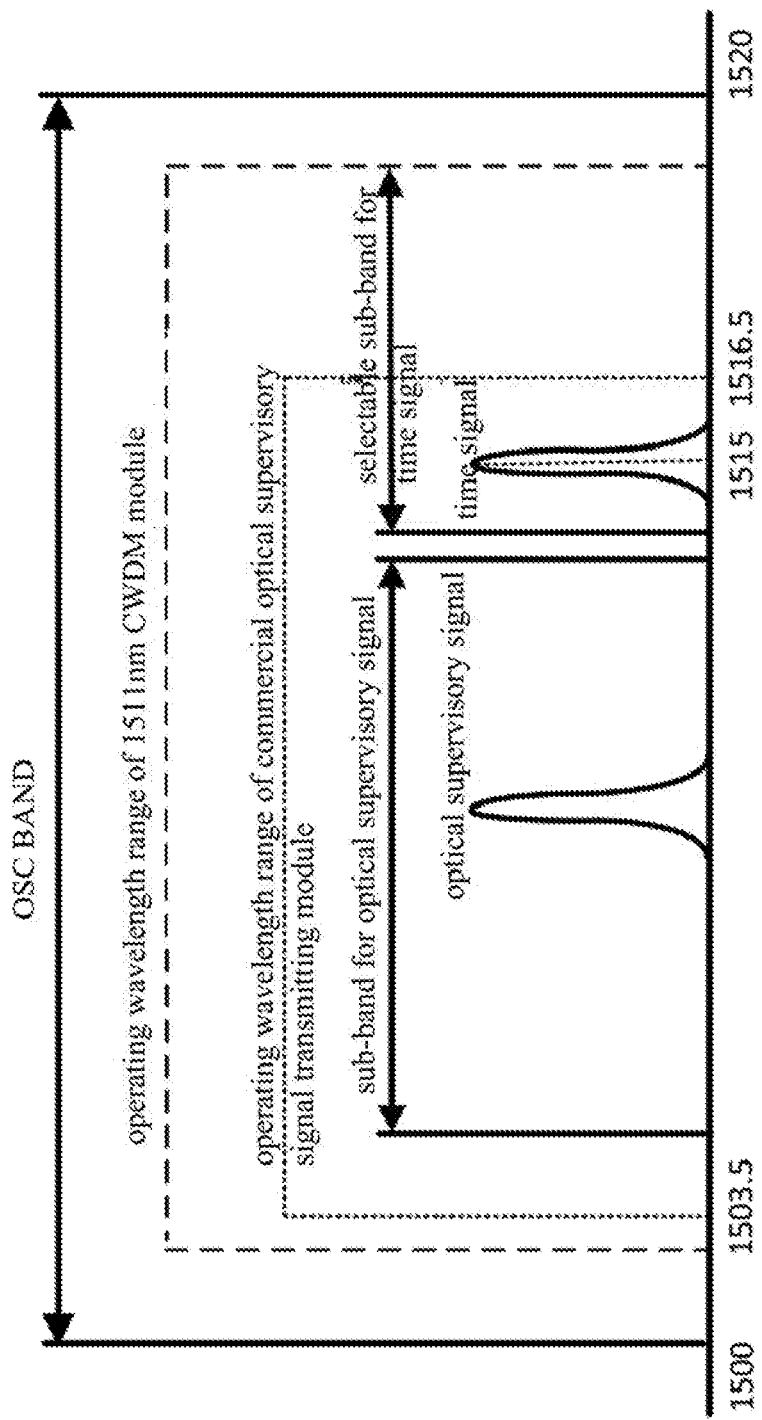
FIG. 2B is a diagram showing OSC band division of a second embodiment of the present invention.

In the second embodiment of the present invention, the division of the OSC band is as shown in FIG. 2B. 1500 nm to 1520 nm is one of OSC bands specified by ITU-T Recommendation G.692, and 1503.5 nm to 1516.5 nm is the operating wavelength range of existing commercial optical supervisory signal optical transmitting modules. The wavelength of optical supervisory signals is within the range of 1503.5 nm to 1516.5 nm, which is smaller than the wavelength range of most existing commercial optical supervisory signal transmitting optical modules. Both a forward time signal and a backward time signal are carried at a wavelength of 1515 nm, which is not covered by the wavelength range of the optical supervisory signal (1506.5 nm to 1513.5 nm), within the operating wavelength range (1503.5 nm to 1518.5 nm as specified by the recommendation) of 1511 nm CWDM modules (i.e., a local wavelength multiplexer/demultiplexer 106, a first wavelength multiplexer/demultiplexer 410, a second wavelength multiplexer/demultiplexer 412, a remote wavelength multiplexer/demultiplexer 206), and the bidirectional transmission is achieved through one-fiber one-wavelength bidirectional time division multiplexing. The communication data signal is carried at a wavelength in the C-band (1530 nm to 1565 nm).

As compared with the first embodiment, in the second embodiment, the wavelength of the optical supervisory signal is further limited within a smaller range (1506.5 nm t 1513.5 nm) by means such as temperature control on a commercial optical supervisory signal optical transmitting module, thereby widening the range of wavelengths selectable for time frequency signal transmission. Thus, in the case of a CWDM channel with a small bandwidth, the time frequency signals are still provided with available wavelengths.

In the second embodiment, the fiber-optic time and data joint transmission system is composed and connected as in the first embodiment. The difference only resides in that the local OSC-band wavelength multiplexer/demultiplexer 105, the first OSC-band wavelength multiplexer/demultiplexer 407, the second OSC-band wavelength multiplexer/demultiplexer 413 and the remote OSC-band wavelength multiplexer/demultiplexer 205 can carry out multiplexing on an optical supervisory signal having a wavelength in a range of 1506.5 nm to 1513.5 nm and a forward time signal having a wavelength of 1515 nm, and can also carrying out demultiplexing to obtain a backward time signal having a wavelength of 1515 nm from the OSC-band. In the second embodiment, the fiber-optic time and data joint transmission method is the same as in the first embodiment, and differs in that the forward time signal and the backward time signal are both carried at a wavelength of 1515 nm, and the optical supervisory signal is carried at a wavelength of 1506.5 nm to 1513.5 nm. The time signal is carried at the wavelength of 1515 nm, however, the time signal may also be carried at any wavelength in the OSC band excluding the range of 1506.5 nm to 1513.5 nm, such as 1516 nm, etc. In addition, the optical supervisory signal is carried at the wavelength of 1506.5 nm to 1513.5 nm, however, the optical supervisory signal may also be carried at a wavelength of 1505.5 nm to 1514.5 nm, etc., as long as the wavelength range carrying the optical supervisory signal is smaller than that of commercial optical supervisory signal optical modules (1503.5 nm to 1516.5 nm) and an available wavelength band is left for carrying the time signals.

The system for fiber-optic time frequency and data joint transmission of the present invention comprises a local end, relay nodes, and a remote end. In each of the local end, relay nodes, and remote end, multiplexing and demultiplexing of time frequency signals, optical supervisory signals, and optical communication data services are performed by CWDM modules and OSC-band wavelength multiplexer/demultiplexers, and processing such as transmitting, relaying, receiving, and the like are performed by respective corresponding processing modules, thereby achieving joint transmission. A sub-band of the standard OSC band is used for transmitting the time frequency signal, so that the transmission of the optical supervisory signal is not influenced while no extra band resource is occupied, thereby improving the utilization rate of the wavelength resources and reducing costs. Besides, the wavelengths of time transfer and frequency transfer in both directions are both in a sub-band of the OSC band, and can be flexibly selected and combined so as to meet requirements of different applications and systems, and the wavelengths can be very close or even same, so that the bidirectional symmetry of the link can be guaranteed to maximum, and the precision of time and frequency transfer is improved.

I claim:

1. A system for fiber-optic time frequency and data joint transmission, comprising:
   a local end, the local end comprising a local time frequency signal unit, a local optical supervisory signal transmitting unit, a local optical communication data unit, a local OSC-band wavelength multiplexer/demultiplexer, and a local wavelength multiplexer/demultiplexer;
   a relay section formed by n number of relay nodes that are connected in series through optical fibers, and
   a remote end,
   wherein n is an integer that equals to or is greater than 0;
   the local end is connected to a first relay node through a first optical fiber, and the n-th relay node is connected to the remote end through a second optical fiber;
   the local time frequency signal unit is connected to a demultiplexing port (2) of the local OSC-band wavelength multiplexer/demultiplexer, the local optical supervisory signal transmitting unit is connected to a demultiplexing port (1) of the local OSC-band wavelength multiplexer/demultiplexer, a multiplexing port (3) of the OSC-band wavelength multiplexer/demultiplexer is connected to a demultiplexing port (3) of the local wavelength multiplexer/demultiplexer, the local optical communication data unit is connected to a demultiplexing port (2) of the local wavelength multiplexer/demultiplexer, and the multiplexing port (3) of the local wavelength multiplexer/demultiplexer is connected to one end of the first optical fiber;
   each relay node comprises a first wavelength multiplexer/demultiplexer, a communication data relay amplification unit, a first OSC-band wavelength multiplexer/demultiplexer, a time frequency bidirectional relay amplification unit, an optical supervisory signal receiving unit, an optical supervisory signal transmitting unit, a second OSC-band wavelength multiplexer/demultiplexer, and a second wavelength multiplexer/demultiplexer;

a multiplexing port (3) of the first wavelength multiplexer/demultiplexer is connected to the other end of the first optical fiber, a demultiplexing port (2) of the first wavelength multiplexer/demultiplexer is connected to a port (1) of the communication data relay amplification unit, a demultiplexing port (1) of the first wavelength multiplexer/demultiplexer is connected to a multiplexing port (3) of the first OSC-band wavelength multiplexer/demultiplexer, a demultiplexing port (2) of the first OSC-band wavelength multiplexer/demultiplexer is connected to the optical supervisory signal receiving unit, and a demultiplexing port (1) of the first OSC-band wavelength multiplexer/demultiplexer is connected to a port 1 of the time frequency bidirectional relay amplification unit;

a port (2) of the time frequency bidirectional relay amplification unit is connected to a demultiplexing port (2) of the second OSC-band wavelength multiplexer/demultiplexer, the optical supervisory signal transmitting unit is connected to a demultiplexing port (1) of the second OSC-band wavelength multiplexer/demultiplexer, a multiplexing port (3) of the second OSC-band wavelength multiplexer/demultiplexer is connected to a demultiplexing port (1) of the second wavelength multiplexer/demultiplexer, a port (2) of the communication data relay amplification unit is connected to a demultiplexing port (2) of the wavelength multiplexer/demultiplexer, and a multiplexing port (3) of the second wavelength multiplexer/demultiplexer is connected to the multiplexing port (3) of the first wavelength multiplexer/demultiplexer at a next relay node through an optical fiber; the n relay amplification nodes of the relay section are connected cascadedly through optical fibers; and the multiplexing port (3) of the second wavelength multiplexer/demultiplexer of the n-th relay node is connected to the second optical fiber;

the remote end comprises a remote time frequency signal unit, a remote optical supervisory signal receiving unit, a remote communication data unit, a remote OSC-band wavelength multiplexer/demultiplexer and a remote wavelength multiplexer/demultiplexer, wherein the remote time frequency signal unit is connected to a demultiplexing port (1) of the remote OSC-band wavelength multiplexer/demultiplexer, the remote optical supervisory signal receiving unit is connected to a demultiplexing port (2) of the remote OSC-band wavelength multiplexer/demultiplexer, a multiplexing port (3) of the remote OSC-band wavelength multiplexer/demultiplexer is connected to a demultiplexing port (1) of the remote wavelength multiplexer/demultiplexer, the remote communication data unit is connected to a demultiplexing port (2) of the remote wavelength multiplexer/demultiplexer, and a multiplexing port (3) of the remote wavelength multiplexer/demultiplexer is connected to the other end of the second optical fiber, an OSC band adopted by the system is a selectable OSC band; and the local OSC-band wavelength multiplexer/demultiplexer, the first OSC-band wavelength multiplexer/demultiplexer, the second OSC-band wavelength multiplexer/demultiplexer, and the remote OSC-band wavelength multiplexer/demultiplexer operate in the selected OSC band for multiplexing/demultiplexing of a wavelength of an optical supervisory signal and a wavelength of a time frequency transfer signal; and wherein the wavelength of the time frequency transfer signal and the wavelength of the optical supervisory signal adopted by the system are both in the OSC band and within non-overlapped wavelength ranges.

2. The system as described in claim 1, wherein the OSC band is 1500 nm to 1520 nm, 1470 nm to 1490 nm, or a 1310 nm band.

3. The system of claim 1, wherein the local wavelength multiplexer/demultiplexer, the first wavelength multiplexer/demultiplexer, the second wavelength multiplexer/demultiplexer, and the remote wavelength multiplexer/demultiplexer are used for multiplexing/demultiplexing of the OSC band and operating optical bands of the local optical communication data unit and the remote communication data unit.

4. The system of claim 1, wherein the time frequency transfer signal and the optical supervisory signal are carried at different optical wavelengths in the OSC band, communication data is carried at wavelengths out of the OSC band, and the three signals are transmitted through one optical fiber by means of wavelength division multiplexing.

5. A method for time frequency and data joint transmission using the system of claim 1, comprising:

(1) transmitting a time frequency signal by forward and backward transmission, wherein the time frequency signal is transmitted in a direction from the local end to the remote end in the forward transmission, comprising generating a forward time frequency optical signal having a wavelength of $\lambda_2$, or $\lambda_2$, $\lambda_3$ when time transfer and frequency transfer are separated, by the local time frequency signal unit, and transmitting the forward time frequency optical signal to the first optical fiber through the local OSC-band wavelength multiplexer/demultiplexer and the local wavelength multiplexer/demultiplexer;

carrying out an amplification process by a first relay node by inputting the optical signal from the first optical fiber into the first OSC-band wavelength multiplexer/demultiplexer by the first wavelength multiplexer/demultiplexer, inputting the forward time frequency optical signal from the first wavelength multiplexer/demultiplexer into the time frequency bidirectional relay amplification unit by the first OSC-band wavelength multiplexer/demultiplexer, carrying out forward relay amplification on the received forward time frequency optical signal by the time frequency bidirectional relay amplification unit, inputting the forward time frequency optical signal from the time frequency bidirectional relay amplification unit into the second wavelength multiplexer/demultiplexer by the second OSC-band wavelength multiplexer/demultiplexer, and inputting an OSC-band optical signal from the wavelength multiplexer/demultiplexer into an optical fiber connected to a next relay node by the second wavelength multiplexer/demultiplexer;

repeating the amplification process of the first relay node by a second relay node, . . . , until by the n-th relay node, inputting the OSC-band optical signal from the wavelength multiplexer/demultiplexer into the second optical fiber connected to the remote end by the second wavelength multiplexer/demultiplexer of the n-th relay node, and receiving a forward time frequency optical signal from the second optical fiber and inputting the OSC-band optical signal into the remote OSC-band wavelength multiplexer/demultiplexer by the remote wavelength multiplexer/demultiplexer, and demultiplexing the received OSC-band optical signal to obtain a forward time frequency optical signal with a wavelength of $\lambda_2$, or $\lambda_2$, $\lambda_3$ when time transfer and frequency transfer are separated, and when transmitted, inputting the forward time frequency optical signal into the remote time frequency signal unit by the remote OSC-band wavelength multiplexer/demultiplexer;

wherein the time frequency signal is transmitted in a direction from the remote end to the local end in the backward transmission process, comprising:

generating a backward time frequency optical signal with a wavelength of $\lambda'_2$, or $\lambda'_2$, $\lambda'_3$ when time transfer and frequency transfer are separated, by the remote time frequency signal unit, inputting the backward time frequency optical signal into the remote wavelength multiplexer/demultiplexer through the remote OSC-band wavelength multiplexer/demultiplexer, and inputting the backward time frequency optical signal into the second optical fiber by the remote wavelength multiplexer/demultiplexer, in each relay node, inputting the optical signal from the second optical fiber into the second OSC-band wavelength multiplexer/demultiplexer by the second wavelength multiplexer/demultiplexer, and demultiplexing the optical signal from the second wavelength multiplexer/demultiplexer to obtain a backward time frequency optical signal with a wavelength of $\lambda'_2$, or $\lambda'_2$, $\lambda'_3$ when time transfer and frequency transfer are separated, and inputting the backward time frequency optical signal into the time frequency bidirectional relay amplification unit by the second OSC-band wavelength multiplexer/demultiplexer; carrying out relay amplification on the received optical signal by the time frequency bidirectional relay amplification unit, inputting the backward time frequency optical signal from the time frequency bidirectional relay amplification unit into the first wavelength multiplexer/demultiplexer by the first OSC-band wavelength multiplexer/demultiplexer, and inputting an OSC-band optical signal from the wavelength multiplexer/demultiplexer into the wavelength multiplexer/demultiplexer of the previous relay node through an optical fiber by the first wavelength multiplexer/demultiplexer; and repeating the amplification process for n times (n≥0), and in the first relay node, inputting the OSC-band optical signal from the wavelength multiplexer/demultiplexer into the first optical fiber by the wavelength multiplexer/demultiplexer; and receiving the optical signal from the first optical fiber and inputting OSC-band light into the OSC-band wavelength multiplexer/demultiplexer by the local wavelength multiplexer/demultiplexer at the local end; carrying out demultiplexing to obtain a backward time frequency optical signal having a wavelength of $\lambda'_2$, or $\lambda'_2$, $\lambda'_3$ when time transfer and frequency transfer are separated, inputting the backward time frequency optical signal into the local time frequency signal unit by the OSC-band wavelength multiplexer/demultiplexer, and receiving the backward time frequency optical signal output from the local OSC-band wavelength multiplexer/demultiplexer and carrying out time frequency comparison and clock synchronization by the local time frequency signal unit;

(2) transmitting an optical supervisory signal, further comprising the steps of:

generating an optical supervisory signal with a wavelength in a range of $\lambda_0$-$\lambda_1$ by the local optical supervisory signal transmitting unit, wherein $\lambda_0$, $\lambda_1$ are both within the OSC band, and the range of $\lambda_0$-$\lambda_1$ does not contain the wavelengths $\lambda_2$, $\lambda_3$ of time and frequency transfer, inputting the optical supervisory signal into the local wavelength multiplexer/demultiplexer through the local OSC-band wavelength multiplexer/demultiplexer, and inputting an optical signal from the local OSC-band wavelength multiplexer/demultiplexer into the first optical fiber by the local wavelength multiplexer/demultiplexer;

carrying out relay amplification on the optical supervisory signal by in the first relay node, inputting the optical signal from the first optical fiber into the first OSC-band wavelength multiplexer/demultiplexer by the first wavelength multiplexer/demultiplexer, demultiplexing the optical signal from the first wavelength multiplexer/demultiplexer to obtain an optical supervisory signal having a wavelength in a range of $\lambda_0$-$\lambda_1$ and inputting the optical supervisory signal into the optical supervisory signal receiving unit by the first OSC-band wavelength multiplexer/demultiplexer, generating an optical supervisory signal with a wavelength in a range of $\lambda_0$-$\lambda_1$ and inputting the optical supervisory signal into the second OSC-band wavelength multiplexer/demultiplexer by the optical supervisory signal transmitting unit, inputting the optical supervisory signal generated by the optical supervisory signal transmitting unit into the second wavelength multiplexer/demultiplexer by the second OSC-band wavelength multiplexer/demultiplexer, and inputting an OSC-band optical signal from the second OSC-band wavelength multiplexer/demultiplexer into the optical fiber connected to a next relay node by the second wavelength multiplexer/demultiplexer;

repeating the amplification process of the first relay node by the second relay node, . . . until by the n-th relay node, and inputting the OSC-band optical signal from the wavelength multiplexer/demultiplexer into the second optical fiber connected to the remote end by the second wavelength multiplexer/demultiplexer;

receiving a forward optical signal from the second optical fiber and inputting OSC-band light into the remote OSC-band wavelength multiplexer/demultiplexer by the remote OSC-band wavelength multiplexer/demultiplexer, and demultiplexing the received OSC-band optical signal to obtain an optical supervisory signal having a wavelength in a range of $\lambda_0$-$\lambda_1$ and inputting the optical supervisory signal into the remote optical supervisory signal unit by the remote OSC-band wavelength multiplexer/demultiplexer;

(3) transmitting a communication data signal by conducting a forward transmission when the transmission of the communication data signal is single-fiber unidirectional transmission or forward transmission and backward transmission when the transmission of the communication data signal is single-fiber bidirectional transmission, comprising conducting the forward transmission by loading the communication data signal onto an optical communication data signal band out of the OSC band by the local optical communication data unit, and inputting the optical communication data signal band into the first wavelength multiplexer/demultiplexer of the first relay node through the first optical fiber by the local wavelength multiplexer/demultiplexer;

carrying out relay amplification on the communication data signal in the first relay node by inputting an optical communication data signal from the first optical fiber into the communication data relay amplification unit by the first wavelength multiplexer/demultiplexer, processing the received optical communication data signal and inputting the processed optical communication data signal into the second wavelength multiplexer/demultiplexer by the communication data relay amplification unit, and inputting the optical communication data signal into the first wavelength multiplexer/demultiplexer of the second relay node, from an output terminal of the second wavelength multiplexer/demultiplexer;

conducting the second relay amplification by repeating the communication data relay amplification process of the first relay node by the second relay node, . . . until by n-th relay node;

inputting the optical communication data signal into the remote wavelength multiplexer/demultiplexer through the second optical fiber from the output terminal of the second wavelength multiplexer/demultiplexer of the n-th relay node, and inputting the signal in the optical communication data band inputted from the second optical fiber into the remote communication data unit by the remote wavelength multiplexer/demultiplexer;

conducting the backward transmission process of the communication data signal by loading a communication data signal onto the optical communication data signal band out of the OSC band by the remote communication data unit, and inputting the optical communication data signal band into the communication data relay amplification unit of the n-th relay node through the second optical fiber and the second wavelength multiplexer/demultiplexer by the remote wavelength multiplexer/demultiplexer;

carrying out relay amplification on the communication data signal, comprising:

in the n-th relay node, processing the received optical communication data signal and inputting the processed optical communication data signal into the first wavelength multiplexer/demultiplexer by the communication data relay amplification unit, and inputting the optical communication data signal backward into the second wavelength multiplexer/demultiplexer of a next relay node by the first wavelength multiplexer/demultiplexer; and carrying out the above communication data relay amplification process backward by all relay nodes in sequence, and in the first relay node, inputting the optical communication data signal into the local wavelength multiplexer/demultiplexer through the first optical fiber by the first wavelength multiplexer/demultiplexer, and inputting the inputted signal in the optical communication data band into the local optical communication data unit by the local wavelength multiplexer/demultiplexer.

6. The method of claim 5, wherein the $\lambda_2$, $\lambda_3$ and $\lambda'_2$, $\lambda'_3$ are optionally equal.

* * * * *